United States Patent [19]

Cummings

[11] Patent Number: 5,733,454
[45] Date of Patent: Mar. 31, 1998

[54] PROCESS AND APPARATUS FOR THE TREATMENT OF FLOWABLE WASTE

[75] Inventor: Robert James Cummings, Spencer, N.Y.

[73] Assignee: EHH Holding Co., Inc., Aurora, N.Y.

[21] Appl. No.: 638,640

[22] Filed: Apr. 26, 1996

[51] Int. Cl.$^6$ .................................................. C02F 3/06
[52] U.S. Cl. .................... 210/603; 210/605; 210/617;
210/622; 210/150; 210/188; 210/195.1;
210/903
[58] Field of Search .............................. 210/603, 615,
210/616, 617, 621, 622, 605, 630, 903,
150, 151, 188, 194, 195.1, 202, 255, 258,
259

[56] References Cited

U.S. PATENT DOCUMENTS

| | | | |
|---|---|---|---|
| 800,187 | 9/1905 | Venable | 210/150 |
| 2,220,859 | 11/1940 | Bispham et al. | 210/150 |
| 4,165,285 | 8/1979 | Wind et al. | 210/195.3 |
| 4,182,675 | 1/1980 | Jeris . | |
| 4,202,774 | 5/1980 | Kos | 210/274 |
| 4,279,753 | 7/1981 | Nielson et al. | 210/615 |
| 4,284,508 | 8/1981 | Jewell | 210/617 |
| 4,311,593 | 1/1982 | Benjes et al. | 210/603 |
| 4,315,823 | 2/1982 | Witt et al. | 210/615 |
| 4,322,296 | 3/1982 | Fan et al. | 210/618 |
| 4,336,135 | 6/1982 | Price | 210/151 |
| 4,351,729 | 9/1982 | Witt | 210/617 |
| 4,366,059 | 12/1982 | Witt et al. | 210/615 |
| 4,415,453 | 11/1983 | Witt et al. | 210/615 |
| 4,482,458 | 11/1984 | Rovel et al. | 210/617 |
| 4,530,762 | 7/1985 | Love | 210/603 |
| 4,532,042 | 7/1985 | Aivasidis et al. | 210/617 |
| 4,560,479 | 12/1985 | Heijnen | 210/617 |
| 4,561,974 | 12/1985 | Bernhard et al. | 210/151 |
| 4,599,167 | 7/1986 | Benjes et al. | 210/188 |
| 4,599,168 | 7/1986 | Benjes et al. | 210/188 |
| 4,609,460 | 9/1986 | Vellinga | 210/188 |
| 4,618,418 | 10/1986 | Heijnen et al. | 210/151 |
| 4,622,147 | 11/1986 | Vellinga | 210/539 |
| 4,627,917 | 12/1986 | Morper | 210/150 |
| 4,632,758 | 12/1986 | Whittle | 210/151 |
| 4,654,308 | 3/1987 | Safi et al. | 435/310 |
| 4,707,252 | 11/1987 | Durot et al. | 210/151 |
| 4,743,376 | 5/1988 | Elmaleh et al. | 210/617 |
| 4,758,339 | 7/1988 | Vellinga | 210/188 |
| 4,762,612 | 8/1988 | Yoda et al. | 210/150 |
| 4,818,404 | 4/1989 | McDowell | 210/617 |
| 4,869,815 | 9/1989 | Bernard et al. | 210/151 |
| 5,080,793 | 1/1992 | Urlings | 210/617 |
| 5,116,505 | 5/1992 | Lourens et al. | 210/617 |
| 5,192,442 | 3/1993 | Piccirillo et al. | 210/616 |
| 5,230,794 | 7/1993 | Heijnen et al. | 210/188 |
| 5,330,652 | 7/1994 | Goldman et al. | 210/150 |
| 5,338,445 | 8/1994 | Zumbragel et al. | 210/188 |
| 5,338,447 | 8/1994 | Vellinga | 210/195.1 |
| 5,348,654 | 9/1994 | Fischer | 210/151 |

*Primary Examiner*—Christopher Upton
*Attorney, Agent, or Firm*—Cumpston & Shaw

[57] ABSTRACT

A process and apparatus for the treatment of flowable waste in a waste treatment reactor and in particular the treatment of waste water in a bioreactor containing a bed of support particles having an attached biofilm and entrapped microorganisms are described. The process includes the steps of intermittently introducing waste water through a discharge port adjacent a bottom surface of the bed to form a series of plugs of waste water integrated with the microorganisms in the immediate vicinity of the discharge port; and maintaining a quiescent period following each introduction of waste water to promote biological degradation of contaminants in the waste water of each plug by the microorganisms and production of treated waste water. The bioreactor includes a bed of support particles having an attached biofilm and entrapped microorganisms covering the bottom; a discharge port in a lower zone of the bed; and a pump fluidly connected to the discharge port for intermittently discharging the waste water through the discharge port in a series of pulses followed by quiescent periods; wherein the microorganisms in the immediate vicinity of the discharge port are integrated with the waste water to form a series of plugs which move upward through the bed responsive to successive discharges of waste water at the discharge port.

56 Claims, 7 Drawing Sheets

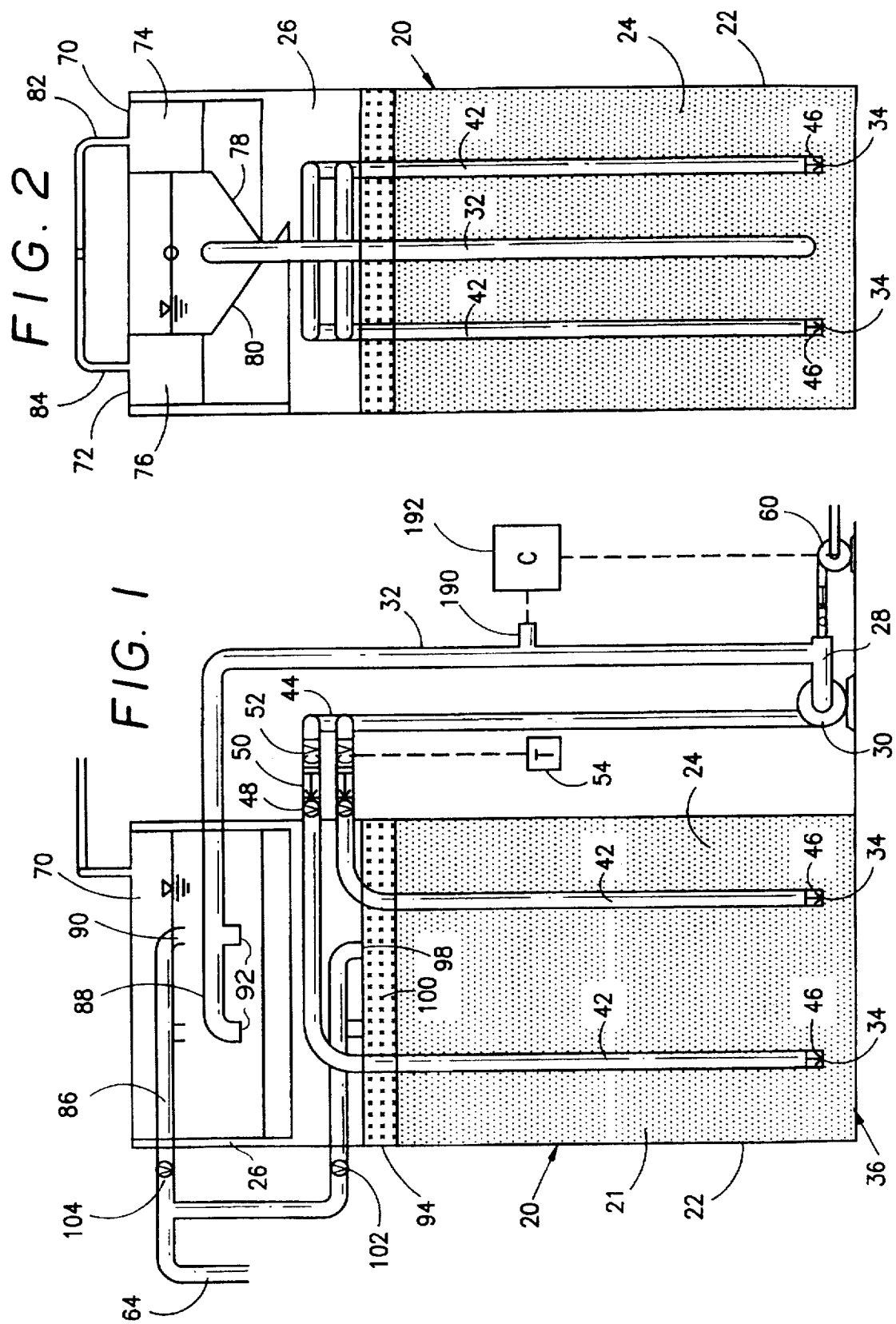

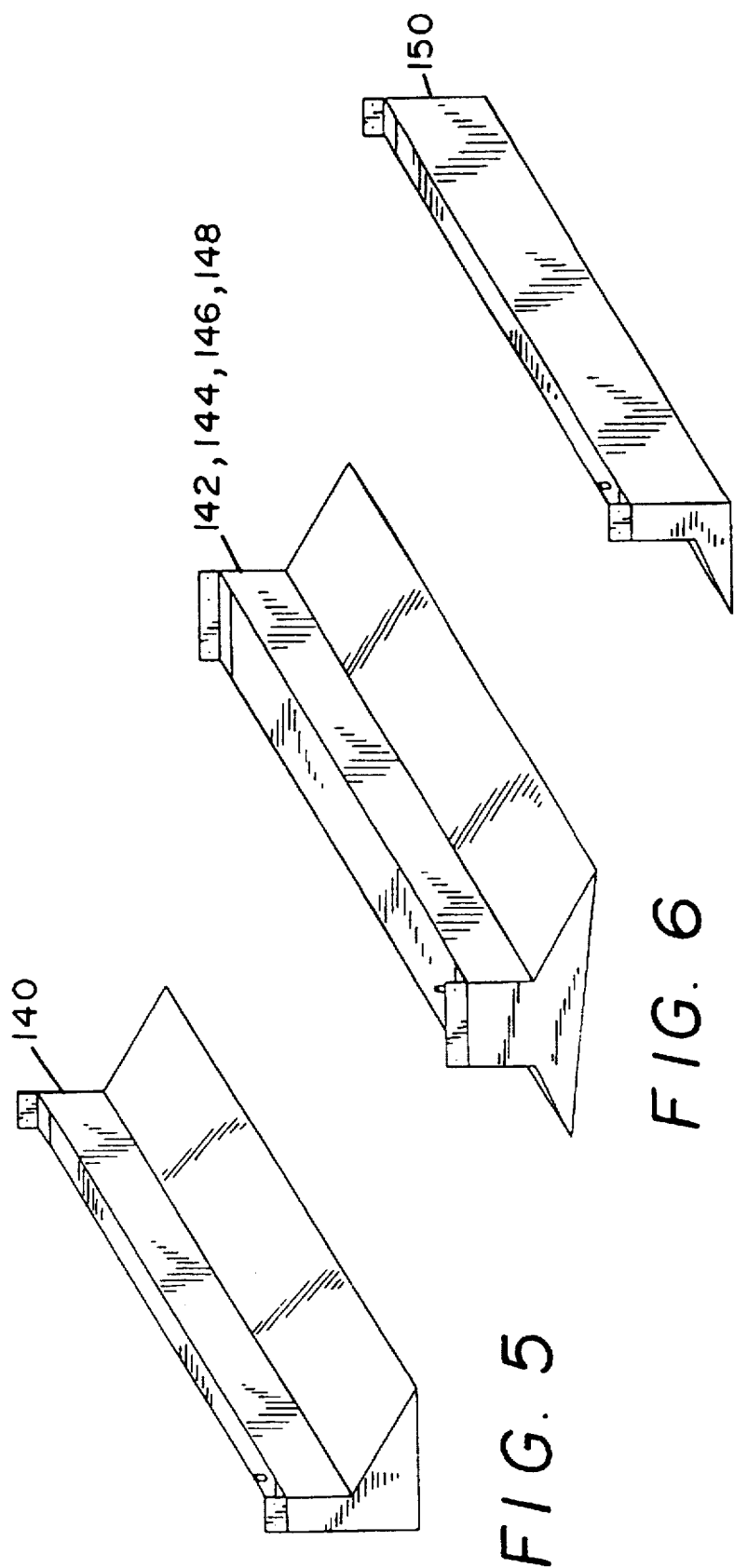

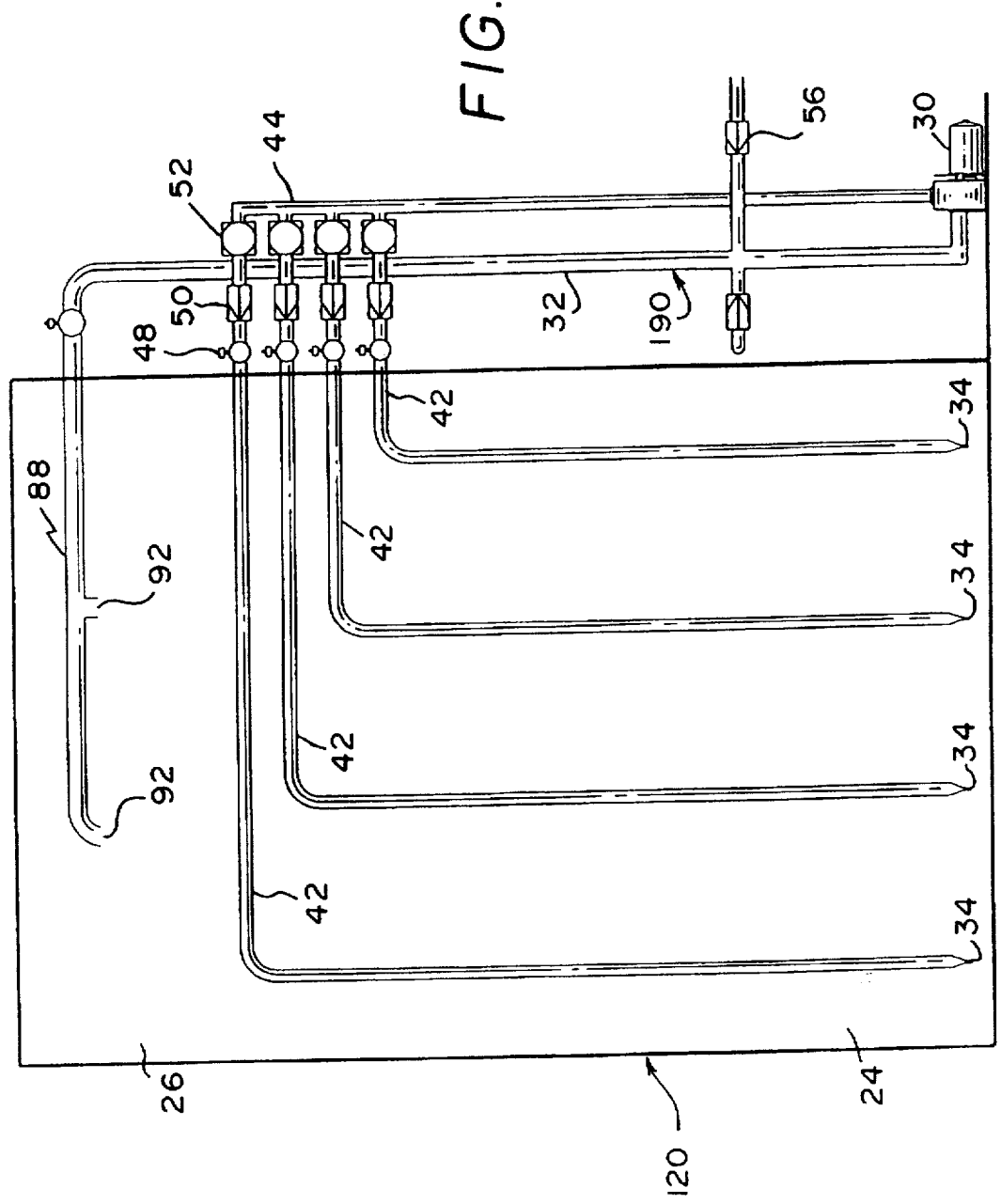

PROCESS AND APPARATUS FOR THE TREATMENT OF FLOWABLE WASTE

FIELD OF THE INVENTION

This invention relates generally to the treatment of flowable waste, and in particular to achieving the efficient treatment of waste water by an attached microbial film, pulsed bed process and apparatus by intermittently discharging waste water into a bed of biologically inert support particles containing attached and entrapped microorganisms.

BACKGROUND OF THE INVENTION

Soluble and particulate colloidal organic material in agricultural, domestic, and industrial waste water can be converted to carbon dioxide, water, and cell biomass or sludge using aerobic microbiological treatment processes, or to methane, carbon dioxide, water and cell biomass using anaerobic microbiological treatment processes.

Aerobic processes, such as the activated sludge process, require the addition of oxygen to the microorganisms of the system. The power required to dissolve this oxygen into the waste water to be treated can range from 0.5 to over 1.0 kilowatt-hours per pound of biodegradable organic material removed. While converting the one pound of organic material to carbon dioxide and water, the aerobic microorganisms will generate 0.4 to 0.6 pounds of sludge which is difficult to handle, stabilize, and dispose. Also as part of the microbial conversion of the organic material certain macro and micro-nutrients, especially nitrogen and phosphorous, will be required which are not always available in the waste water to be treated.

Anaerobic microbial treatment processes produce energy in the form of a substitute natural gas, require no aeration energy and minimal power input, produce minimal quantities of excess cellular material, and require minimal quantities of nutrients. However, they have been considered severely limited in application because of their low rates and efficiencies of conversion, sensitivity to variable loadings, and poor aesthetic effluent quality. Several anaerobic systems have been developed which improve the efficiency of anaerobic processes and provide treatment systems with lower operating costs over their aerobic counterparts. The upflow anaerobic sludge blanket (UASB), the anaerobic static downflow or upflow filter, the anaerobic fluidized bed, and the anaerobic attached film expanded bed are all recognized waste water treatment systems.

The UASB process is a high rate anaerobic process in which inert particles from the bioresistant portion of a seed sludge or feed slurry serve as nuclei for the growth of dense sludge flocs or granules. Waste water is passed upward through the sludge blanket. The granulation process is essential for achieving high concentrations of bacteria. However, the biological concentrations are not uniform through out the blanket. The greatest concentrations are generally at the bottom of the reactor where it is difficult to integrate waste water to be treated with the bacteria, and least near the top, where integration is most uniform. Such systems are not efficient.

There are many anaerobic downflow and upflow static bed filter processes, including combinations of both. Such processes have static filters and are faced with minimal surface area due to the diameter of the support media required to minimize plugging. Fluidized bed technology overcomes the clogging problems encountered in static filters by placing a bed of small diameter, biofilm support material in the reactor and hydraulically fluidizing the bed with waste water. The upflow velocity of liquid flow is sufficiently high to buoy the particles and impart to them an appearance of movement within the bed. Typical bed expansion rates are greater than 100% of the static volume. The ratio of particle surface area to volume is low, recycle flow rates are high, and the ability to handle solids is poor.

The anaerobic attached film expanded bed technology uses a hydraulically expanded bed and typical expansion rates are about 20%.

U.S. Pat. No. 4,284,508 to Jewell discloses a hydraulically expanded bed of small diameter inert particles with attached anaerobic microorganisms for purifying waste water of biodegradable organics. The waste water is introduced through holes in the bottom of the reactor and flows continuously upward at a low velocity through the bed during which attached bacteria multiply and convert the organic material into methane and carbon dioxide gases, purified water and a small amount of residual effluent material. The residual effluent material is filtered by the film as it flows upward through the filter bed. Typical expansion of the bed is approximately 20% of the static volume. The inert support particles with particle diameters less than 0.2 mm, provide an extremely large surface area for biological attachment and therefore high concentrations of microorganisms per unit volume are possible. In this expanded bed the particles are primarily substantially motionless and are merely suspended in a given volume by the water passing there through. The organic waste material is pumped into the bottom of the attached film expanded bed and flows upwardly at a relatively low velocity of from 0.1 to 8 gal/min/ft². The low flow rate maintains a floating expanded bed through which the particles are evenly distributed and, furthermore, ensures that the bacteria are retained in the bed. Partially filtered and treated waste material is recycled from the top to the bottom of the bed. Upon completion of treatment a mixture of gas and effluent material is delivered from the top to an inverted siphon where methane gas and carbon dioxide are separated from the effluent material comprising stabilized sludge and purified water. The rate of flow of material through the expanded bed may be controlled by pumps to account for varying biomass within the bed and to maintain a constant expanded bed level. Recycling of the treated waste material controls the low-velocity upward flow. A serious disadvantage of this system is that to ensure even expansion of the bed and even distribution of the waste water, small diameter cylindrical reactors are required. Scale-up of the process to full scale applications with a high rate of anaerobic treatment has not been achieved.

It is an object of this invention to provide a system for the high rate treatment of waste streams.

It is an object of this invention to provide a system for the high rate biological treatment of waste water.

It is an object of this invention to provide a system which maximizes unit volume microorganism concentrations.

It is an object of this invention to provide a system which maximizes contact of the waste water to be treated with the active microorganisms.

It is an object of this invention to provide a system which maximizes waste water filtration.

It is an object of this invention to provide a system which minimizes energy requirements.

It is an object of this invention to provide a system which ensures even distribution of the waste water.

It is an object of this invention to provide a system which maximizes process control.

SUMMARY OF THE INVENTION

Briefly stated the present invention describes a process for the biological treatment of waste water in a bioreactor containing a bed of support particles having an attached biofilm and entrapped microorganisms in a lower zone of the bioreactor comprising intermittently introducing waste water through a discharge port adjacent a bottom surface of the bed to form a series of plugs of waste water integrated with the microorganisms in the immediate vicinity of the discharge port; and maintaining a quiescent period following each introduction of waste water to promote biological degradation of contaminants in the waste water of each plug by the microorganisms and production of treated waste water.

In another aspect of the invention the waste water is introduced through each one of two or more discharge ports in a sequential manner.

In an other aspect of the invention there is provided an apparatus for the biological treatment of waste water comprising a bioreactor having a bottom; a bed of support particles having an attached biofilm and entrapped microorganisms covering the bottom; a discharge port in a lower zone of the bed; and a pump fluidly connected to the discharge port for intermittently discharging the waste water through the discharge port in a series of pulses followed by quiescent periods so that the microorganisms in the immediate vicinity of the discharge port are integrated with the waste water to form a series of plugs which move upward through the bed responsive to successive discharges of waste water at the discharge port.

In another aspect of the invention the apparatus comprises two or more spaced apart discharge ports in a lower zone of the bed.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 1 is a side elevation view of a waste treatment vessel.

FIG. 2 is a front elevation view of a waste treatment vessel.

FIGS. 5, 6, and 7 are perspective views of the gas collectors.

FIG. 8 is an end elevation view of the waste recycling system.

DETAILED DESCRIPTION OF THE INVENTION

Figure 4:
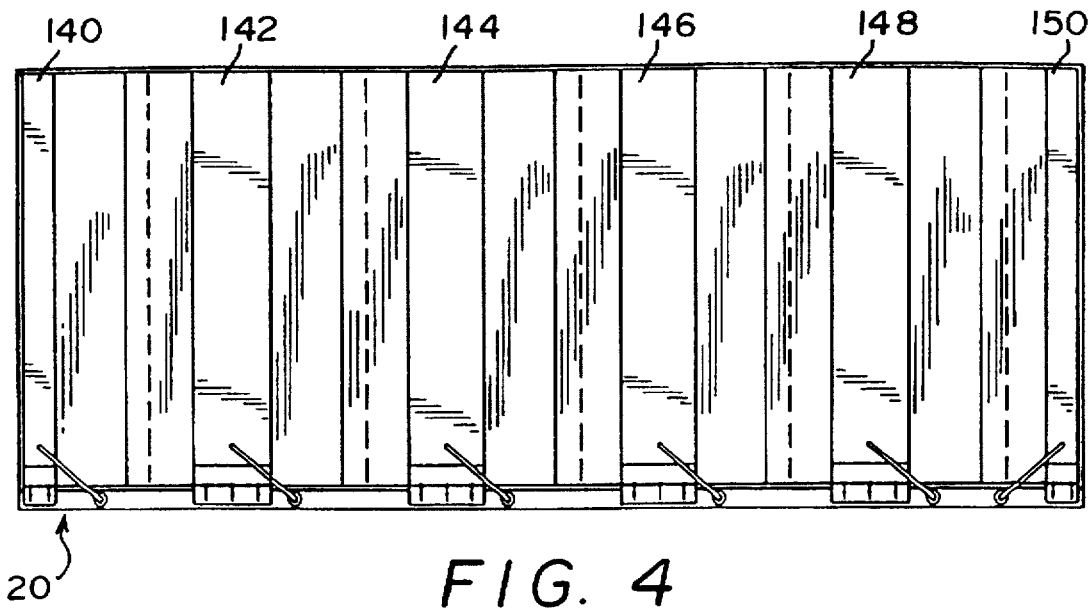
FIG. 4 is a top view of a waste treatment vessel.

The attached film pulsed bed process of the invention provides an inexpensive, low operating cost system to achieve high rate, highly efficient waste stream treatment. Treatable waste includes any flowable waste stream which can be pumped into a waste treatment vessel having a bed of particles capable of degrading the contaminants in the stream. Such waste streams include domestic, industrial, agricultural, and ground waters as well as semi-solid waste water streams such as septage, waste activated sludge, and other domestic, industrial and agricultural slurries, including solvents, oils and the like. The bed of particles can include porous or nonporous water insoluble inorganic and organic materials capable of removing contaminants in the stream or supporting agents for removing contaminants in the stream, for example, microorganisms, catalysts and adsorbents.

The process is particularly adaptable to the treatment of waste water with a bed of attached and entrapped microorganisms. The system achieves continuous and complete integration of untreated waste water with treated waste water prior to introduction of the mixture to the bed of attached and entrapped microorganisms.

Referring to FIGS. 1 and 2 there is shown a single waste treatment vessel, bioreactor 20, composed of two zones, a lower zone 22 in which a heterogeneous mixture of microorganisms, for example, bacteria become attached to and entrapped within a bed of small diameter, biologically inert, support particles 24, and an upper zone 26 in which separation of treated waste water from gaseous and particulate by-products is achieved. The waste water to be treated is introduced into the suction side 28 of a low to medium head, medium to high volume recycling pump 30 which recycles treated water from the upper zone 26 of the reactor through the recycling pipe 32 and intermittently introduces the mixture of treated and untreated waste water to specifically located discharge ports 34 located near the bottom surface 36 of the lower zone 22 of the reactor. The spacing between discharge ports is between about 6 and 60 inches, preferably between about 12 and 36 inches.

The flow of waste water can contain from 100% to 0% untreated waste water and from 0% to 100% treated waste water.

The support particles have a diameter, preferably between 0.005 and 3 mm, more preferably between about 0.05 and 0.2 mm. The specific gravity of the particles is preferably between about 0.01 and 3 grams per milliliter. The particles include porous or non-porous water insoluble inorganic and organic materials, such as sand, garnet, volcanic cinders, flyash, coal, glass, plastic, activated carbon, alumina and diatomaceous earth and mixtures thereof. Such particles have very high surface area to volume ratios for attachment of active microorganisms and assure that maximum concentrations of the active biological populations within the pulsed bed system will be obtained.

In the preferred embodiment of the invention individual discharge systems consisting of individual pipelines 42 extend from a common header or distributor 44 on the discharge side of the recycling pump 30. The common header is external of the reactor sidewall and the pipelines 42 extend into the reactor horizontally through the reactor sidewall and above the bed of support media and microorganisms 24. The pipelines 42 then sweep down vertically into the bed 24 to a specific discharge port 34 above the bottom of the lower portion of the reactor. Each discharge pipeline may terminate in a one way valve 46 to prevent the backflow of support media and microorganisms into the pipeline during periods of zero flow. Between the reactor external sidewall and the common header 44 each discharge pipeline may contain an isolation valve 48, a one way valve 50 and a control pinch valve or equivalent 52. The pinch valve can be pneumatically or electrically operated. A suitable pinch valve is available from Red Valve, Carnegie, Pa. A timer 54, for example a cam timer or equivalent device, is used to control the operation of each control pinch valve to achieve an intermittent flow of waste water through each discharge pipeline.

The flow of recycled liquid through the lower portion of the reactor bed is, preferably, independent of the untreated waste water flow. This is accomplished by introducing the untreated waste water either by a feed pump 60 or by gravity into the suction side 28 of the recycling pump 30. The feed pump 60 is preferably oversized by a factor of about two, so that for a 10,000 gallon per day system the feed pump is preferably rated at 20,000 gallons per day. Thus, the flow of liquid through the recycling pump 30 remains relatively constant while the flow of untreated waste water can be highly variable. Untreated waste water flows in excess of the recycle flow have no effect on the hydraulic flows within the bed with this flow configuration. Excess liquid which does not pass through the recycling pump 30 from the upper zone 26 passes from the system through the liquid effluent system 64. Under circumstances in which there is no flow of untreated waste water, the entire quantity of liquid passing through the recycling pump is the treated waste water from the upper zone 26 of the reactor. The rate of flow of waste water to the common header of the recycling system is preferably between about 0.15 to 15 gallons/minute per square foot of biological bed impacted during the pulse, more preferably between about 3 to 9 gallons/minute per square foot. The pump pressure must be sufficient to overcome the combined static pressure of the bed and friction losses of the plumbing.

The liberation of gaseous by-products from attached particulate material from the bed prior to the waste water entering the waste water recycling system or being eliminated from the reactor through the effluent system is achieved with a series (minimum of two) of overlapping baffle configurations which simultaneously perform the task of gas collector and liquid-solids separator. Referring to FIG. 2, the baffle/gas collectors 70, 72 provide headspace zones 74, 76 to accumulate gaseous products and sloping sidewalls 78, 80 to provide a surface onto which the particulate materials with attached gas bubbles contact. Upon contact, the particulate material is liberated from the gas bubble and quickly settles back into the bed while the gas bubble rises along, for example, the sloping sidewall 78 of a baffle/gas collector 70 to the gas accumulation zone 74. The gas is vented from the headspace zone through the ports 82, 84 located in the top of the collectors.

The system, preferably, discharges or recycles only clarified treated waste water. This is accomplished by locating the liquid effluent 86 and recycle 88 inlet plumbing above the clarification baffles of the baffle/collector system. The effluent inlet plumbing 86 within the reactor may consist of a horizontal pipe with one or more openings 90 or a weir configuration. The effluent inlet plumbing is, preferably, directly accessible from the top of the reactor. The inlet recycle plumbing 88 will be located below the effluent inlet plumbing and may consist of a horizontal pipe with one or more openings 92. Stabilized sludge is accumulated in an intermediate zone 94 above the bed. The sludge is readily removed from the reactor as a part of the normal operation. This is accomplished by positioning one or more internal sludge removal pipeline(s) consisting of horizontal pipe(s) 96 with one or more openings 98 in the intermediate zone 94 above the reactor bed. Due to its lower density, sludge to be wasted from the system migrates up through the bed and accumulates as a sludge layer 100 on top of the reactor bed. As the sludge accumulates, the thickness of the sludge layer will increase. When the thickness of the accumulating sludge increases to a predetermined level, a sludge wasting valve 102 is manually or automatically opened as an effluent wasting valve 104 is closed. Thus, sludge is wasted at the rate of the influent waste water flow until the sludge layer decreases to a predetermined level, at which point the valves are reset to their original positions.

The total recycle flow, consisting of the mixture of treated and untreated waste water passing through the recycling pump 30, is sequentially directed to each of the independent discharge ports such that a pulse of the waste water mixture is introduced to a specific discharge port while the other discharge ports receive zero recycle flow. After all discharge ports have been pulsed, the sequence is repeated. During the pulse, the bed is hydraulically lifted and completely integrated with the waste water mixture at the bottom of the lower portion of the reactor around the discharge port. At each independent discharge port a plug flow of the mixture of treated and untreated waste water integrates with the attached and entrapped microorganisms in the immediate vicinity of the discharge port and simultaneously percolates upward through the bed. In this way distribution of the waste water throughout the reactor is accomplished. After the pulse and while the next discharge port is receiving its pulse, the microorganisms in the plug receive a quiescent time to achieve conversion of the organic material in the waste water. The original pulsed waste water mixture moves intermittently as a plug upward through the bed as the ensuing pulses lift and mix the bed above the discharge port. The pulse interval, that is the length of time the flow is directed to any one discharge port or group of ports is preferably between about 6 seconds and 60 minutes, more preferably between about 1 and 5 minutes.

Opening a control valve causes a pulse of waste water to be discharged at a discharge port. The pulse fluidizes the medium in a zone around the discharge port and integrates the waste water with the particles and attached and entrapped microorganisms in the zone to form an integrated plug. Each subsequent pulse causes upward movement of the plug containing particles, liquid and gas through upper zones until the plug reaches the top of the bed. Lateral mixing of the plug is minimal even though the plugs can expand horizontally as they rise vertically through the bed. The pulses may not be identical at each outlet since it is difficult to control fluid flow through different lengths of pipe. In one embodiment of the invention the system operates with one discharge port for each discharge pipe. In another embodiment of the invention more than one discharge port is associated with each discharge pipe.

The system of the invention eliminates the need for a very specific flow rate of recycled liquid through the bed of attached and entrapped microorganisms. By intermittently pulsing the waste water flow complete integration of the untreated waste water with the attached and entrapped microorganisms with minimal volumes of recycled liquid and without continuous hydraulic recycling of liquid is achieved. The pulse achieves integration of the untreated waste water with the active microorganisms at the discharge port and the bed in the immediate vicinity above the discharge port, without maintaining a continuously expanded, fluidized or completely mixed hydraulic state of the entire bed. Any flow rate, which can achieve integration in a small area around each discharge port, is satisfactory. This provides a wide range of recycle flow rate and resulting upflow velocities which are acceptable for successful system operation and significantly reduces the volume of liquid which must be recycled to hydraulically control the bed.

The differences in density between treated waste water, the gaseous by-products and particulate material allow their separation in the quiescent zone above the bed. With each pulse at a specific discharge port, the bed is hydraulically lifted and gaseous by-products are released, carrying particulates into the zone above the bed. Directly after the pulse, the quiescent period which occurs as other discharge ports are sequentially pulsed, affords time for the particulate material lifted by the gases to settle back in the bed.

In order to initiate growth of the attached microorganisms on the surface of the support particles the pulsed bed system is operated with intermittent batch additions of inoculum slurries until the onset of biological activity within the pulsed bed occurs. Thus the pulsed bed is placed in operation using low influent flows of the untreated waste water to be treated and containing a balance of nutrients required for biological activity. Batch doses of known capability to degrade the untreated waste water are added directly to the suction side of the recycling pump with the untreated waste water and nutrients. The inoculum is entrapped within the bed and retained for long periods enabling rapid attachment and process start up.

The system operates optimally at different temperatures depending on the microorganisms involved and the nature of the waste water to be treated. An operating temperature of between about 4° and 60° C. is preferred. The operating temperature can be controlled by passing the waste water flow through a heat exchanger before it enters the reactor. The heat exchanger can be connected to a heat source, for example, a hot water circulation pump. Thermophilic bacteria are more effective at temperatures of about 50° C. to 60° C. and are preferred for waste water containing high concentrations of biodegradable organic material, for example, fats and glycols. Mesophilic bacteria are more effective at temperatures between 30° and 40° C. and are preferred for waste water containing intermediate concentrations of biodegradable organic material including landfill leachate and certain food processing waste water. Cryophilic and psychrophilic bacteria are more effective below 25° C. and are preferred for dilute waste water including domestic sewage.

In some operations the untreated waste water is first passed through a basket strainer to remove particles over a predetermined size.

In another aspect of this invention flocculation of particulate material wasted from the pulse bed system is achieved in the sludge layer. As the particulate material passes through the pulsed bed, the intermittent flow of liquid through each discharge zone encourages filtration of entrapped particulate material. The trapped particulate material is pressed into large aggregates during the quiescent periods between pulses. These aggregates result in a sludge layer which in itself becomes a filter to entrap more particulate material forming large flocs. Thus, the sludge wasted from the pulsed bed system has exceptional settling and dewatering characteristics and the need for an extensive three phased separation system in the top of the reactor is eliminated.

The process and apparatus described above utilizes more than one discharge port in the bioreactor. However, it will be readily apparent to those with skill in this art that a bioreactor containing a bed of support particles having an attached film and entrapped microorganisms and a single discharge port adjacent a bottom surface of the bed could be intermittently charged with waste water. In such a process a plug of integrated waste water and microorganisms in the immediate vicinity of the discharge port would be formed. A series of pulses followed by quiescent periods would form a series of plugs which would move upward through the bed responsive to successive discharges of waste water at the port. Such an apparatus provided with a recycling pump, a baffle/gas collector system and the corresponding influent and effluent pipes described above constitutes an effective biological treatment system.

The single recycling system described above for FIGS. 1 and 2 can be expanded so that one or more recycling systems are connected in series in a single reactor. By combining one or more recycling systems within a single reactor highly efficient removal of the biodegradable organic material is achieved. Untreated waste water is added to a first recycling system, as described above, and the resulting partially treated waste water moves laterally, by gravity, through successive recycling systems connected in series with each other, with the final liquid effluent being removed from the last recycling system of the series.

Figure 3:
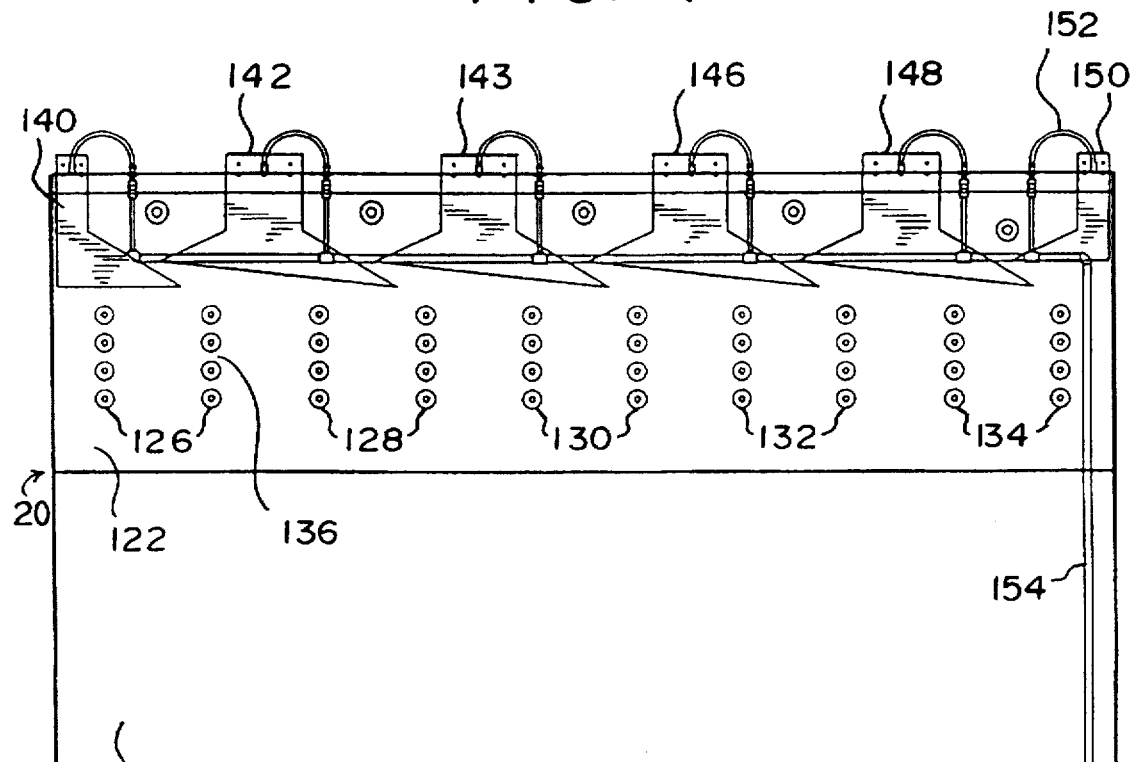
FIG. 3 is a front elevation of a waste treatment vessel and the gas collection system.

Referring to FIG. 3 there is shown a front elevation view of a single waste treatment vessel, bioreactor 120, having upper and lower sections 122, 124 respectively and five recycling systems 126, 128, 130, 132, 134 arranged side-by-side and connected in series. Each system has a set of inlets 136, for example a set of eight inlets, for the individual discharge pipelines 42 (FIG. 1). The gas collection system includes six overlapping baffle/gas collectors 140, 142, 144, 146, 148, 150 connected across the top of the vessel. A top view of the bioreactor 120 and the baffle/gas collectors 140, 142, 144, 146, 148, 150 is shown in FIG. 4. Gas collecting lines 152 from each baffle/gas collector vent the gases from the bioreactor via gas pipeline 154.

Referring to FIGS. 5, 6 and 7 there are shown preferred embodiments of the baffle/gas collectors depending upon where they are positioned on the bioreactor. The baffle/gas collector 140 is positioned on the left side of bioreactor 120. The baffle/gas collector 142 overlaps baffle/gas collector 140 and together with baffle/gas collectors 144, 146, 148 of the same construction and baffle collector 150 positioned on the right side of the bioreactor form a closed system for separating the gas and particulate material from the five recycling systems. The sidewall slope angle of each baffle/gas collector is preferably between 15° and 45° from the horizontal, more preferably between 25° and 35°. The sidewall overlap is preferably between 1 in. and 12 in., more preferably between 3 in. and 8 in.

Referring now to FIG. 8 there is shown an end elevation of the bioreactor 120. The first recycling system of the series of five recycling systems is shown. The recycling pump 30 pumps a mixture of treated and untreated waste water through a common header or distributor 44 through each discharge pipe 42 via a pinch valve 52, a one-way valve 50 and an isolation valve 48 for each discharge pipe. If desired the waste water flow can be passed through a heat exchanger 58 (FIG. 9) to achieve a desired operating temperature. The treated waste water is drawn by suction from the upper zone of the bioreactor through inlets 92 and pipe 88 and pipe 32 to the recycling pump 30. Untreated waste water is pumped into the suction side of the recycle pipe 32 through inlet valve 56 and mixed with the recycle flow. The waste water is discharged from each discharge pipe 42 at a discharge port 34 near the bottom of the bed 24 of the bioreactor.

Untreated waste water flows in excess of the recycle flow have no effect on the hydraulic flows within the bed with this flow configuration. Excess waste water which does not pass through the recycling pump 30 flows backward along the recycling pipe 32 of the pump, passes into the upper zone 26 of the reactor where it is mixed with the treated waste water which has been expelled from the bed. The combined waste water then passes by gravity for series treatment by subsequent recycling stages. Under circumstances in which there is no flow of untreated waste water, the entire quantity of liquid passing through the recycling pump is the treated waste water from the upper zone 26 of the reactor.

Figure 9:
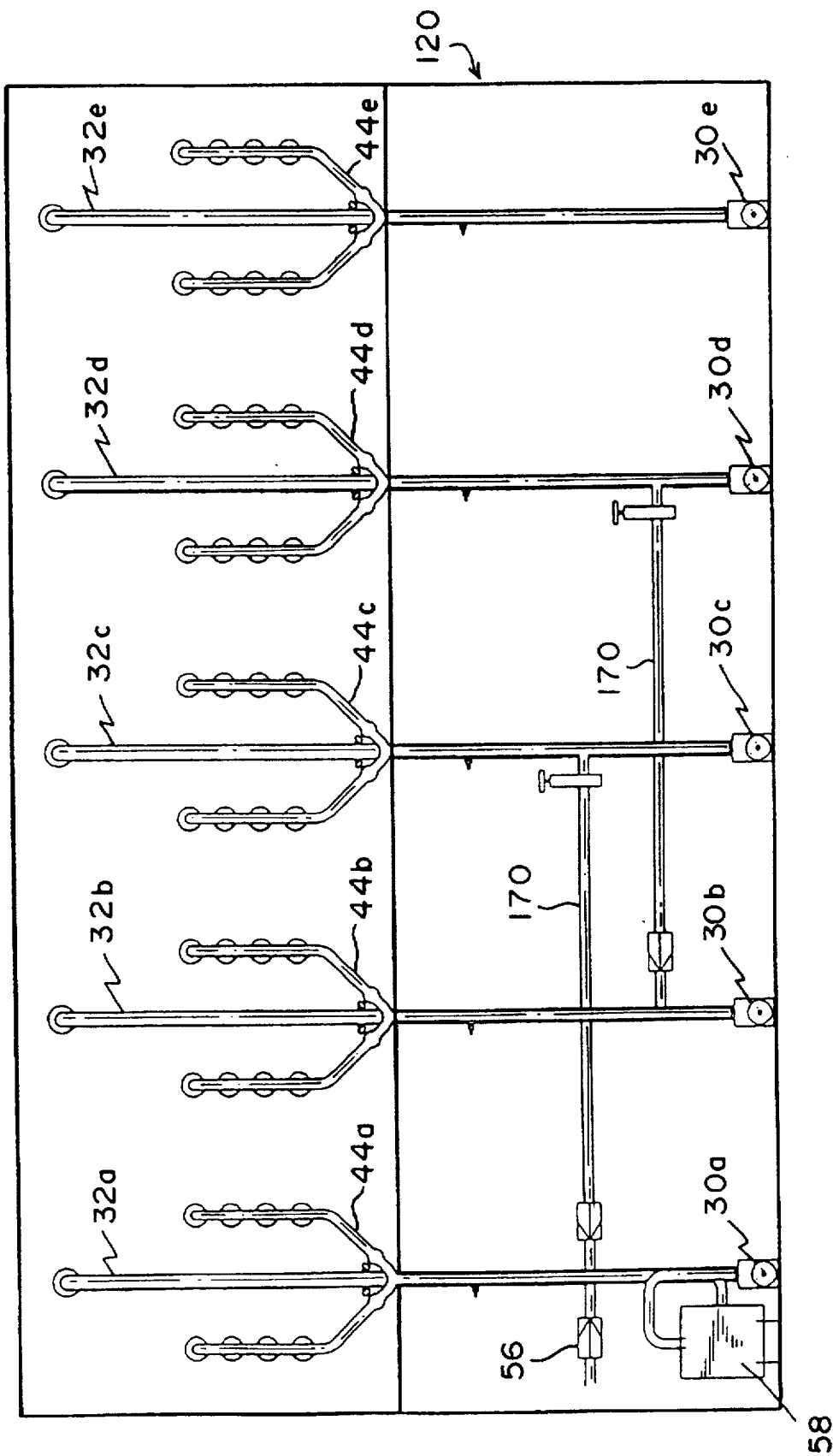
FIG. 9 is a front elevation view of the waste recycling system.
Figure 10:
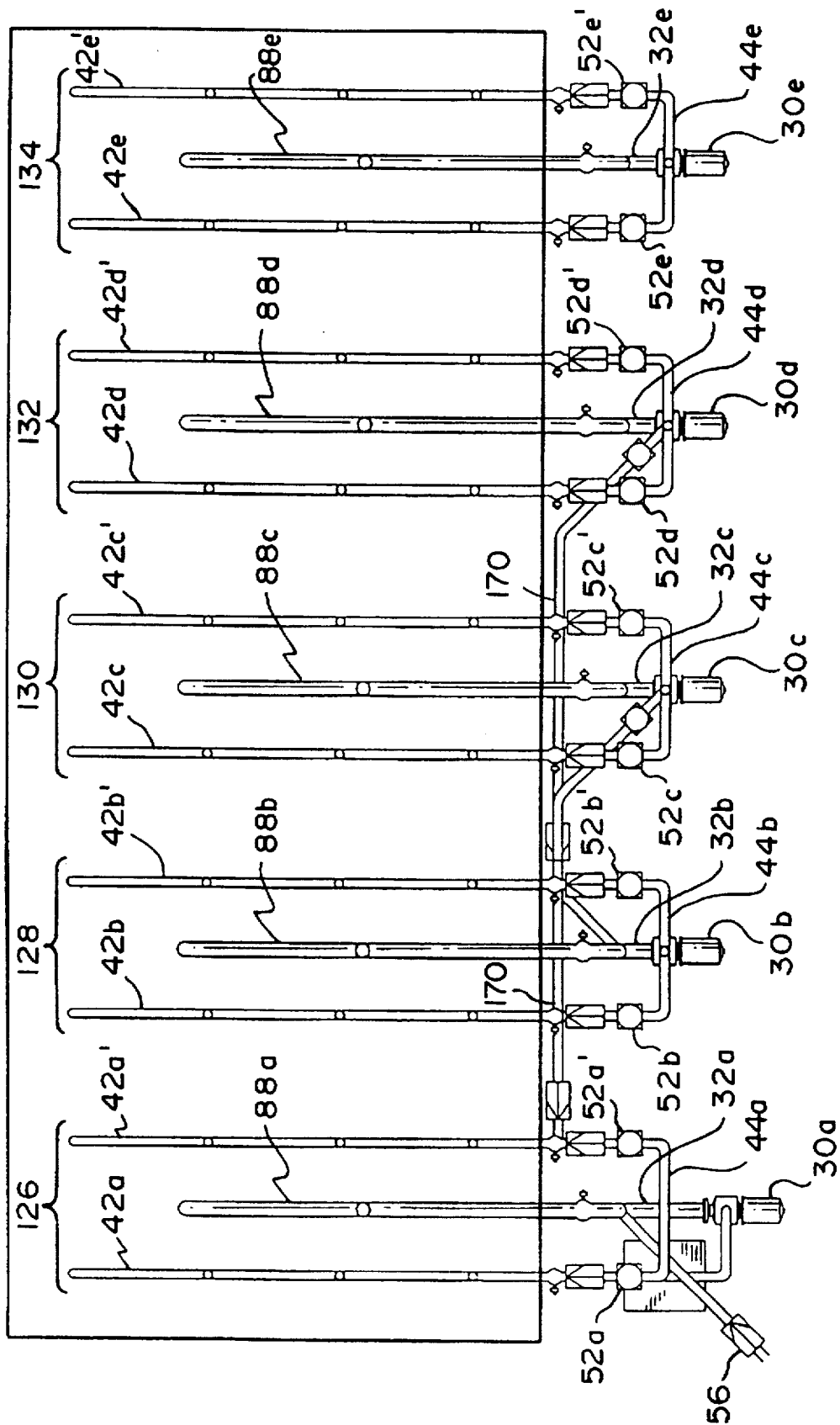
FIG. 10 is a top elevation view of the waste recycling system.

Referring now to FIGS. 9 and 10 there is shown a front elevation view and a top view of the bioreactor recycling system having the five recycling systems 126, 128, 130, 132, 134 connected in series. The untreated waste water is charged from a pump at one end of the bioreactor through inlet valve 56 into the first recycling pump 30a. Each recycling system is connected to a recycling pump 30(a, b, c, d, e) which recycles treated waste water from recycling pipes 88(a, b, c, d, e), 32(a, b, c, d, e) through its common header 44(a, b, c, d, e) and a set of pinch valves 52(a, b, c, d, e, a', b', c', d', e') to discharge pipes 42(a b, c, d, e, a', b', c', d', e').

A timer and/or microprocessor control the sequential opening and closing of each pinch valve so that the waste water is added intermittently in a pulse like manner. In a preferred embodiment, each of the five sets of pinch valves is simultaneously opened according to the same sequence. By passing the waste water through a heat exchanger 58 the temperature of the waste water and the bed can be adjusted.

In a preferred configuration of the interconnected systems, alternating systems can have an additional connecting pipe 170 between alternating recycle pipes 32 which allows insufficiently treated waste water from a downstream recycling system to be returned to an upstream recycling system for a subsequent treatment. This is particularly useful in an overload situation of the first stage recycling system so that subsequent recycling systems assist the first stage to accomplish treatment. In a series recycling system effluent water could be transferred downstream by lateral flow and recycled downstream or returned from a downstream recycling unit to an upstream recycling unit. Similarly, with a high concentrate of waste water, partially treated waste water may be expelled from the bed and then transferred to a downstream recycling system.

Such a system is capable of treating high strength waste successfully, including waste more than one thousand times more contaminated than domestic sewage. When the film of bacteria on the particles of the bed is overloaded with waste, more bacteria are formed and system efficiency increases.

Figure 11:
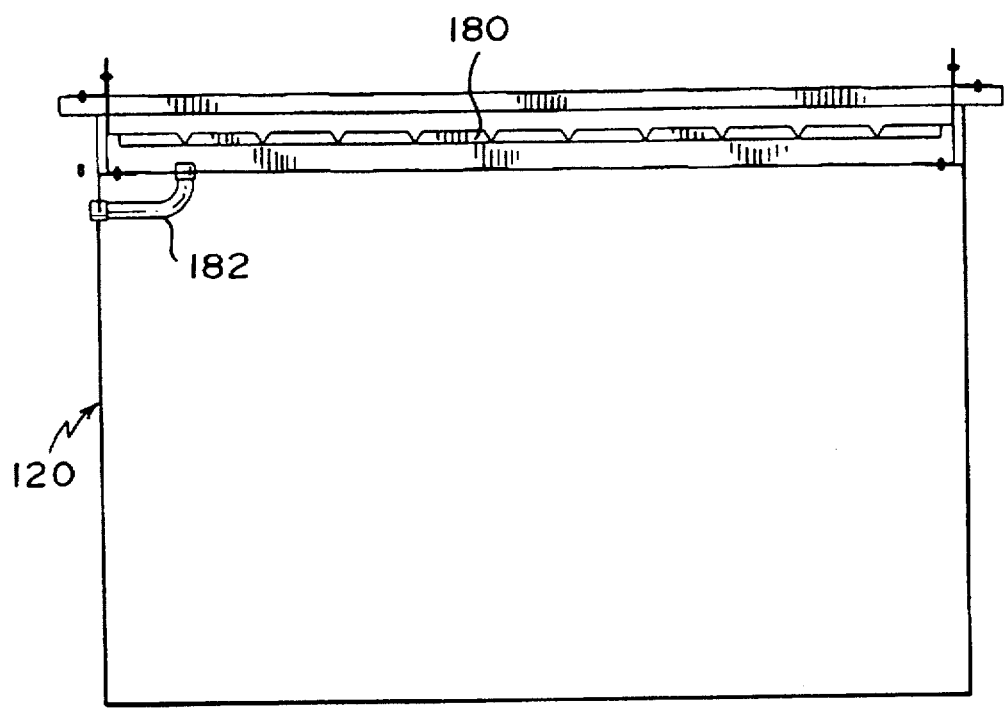
FIG. 11 is a perspective view of the weir assembly.
Figure 12:
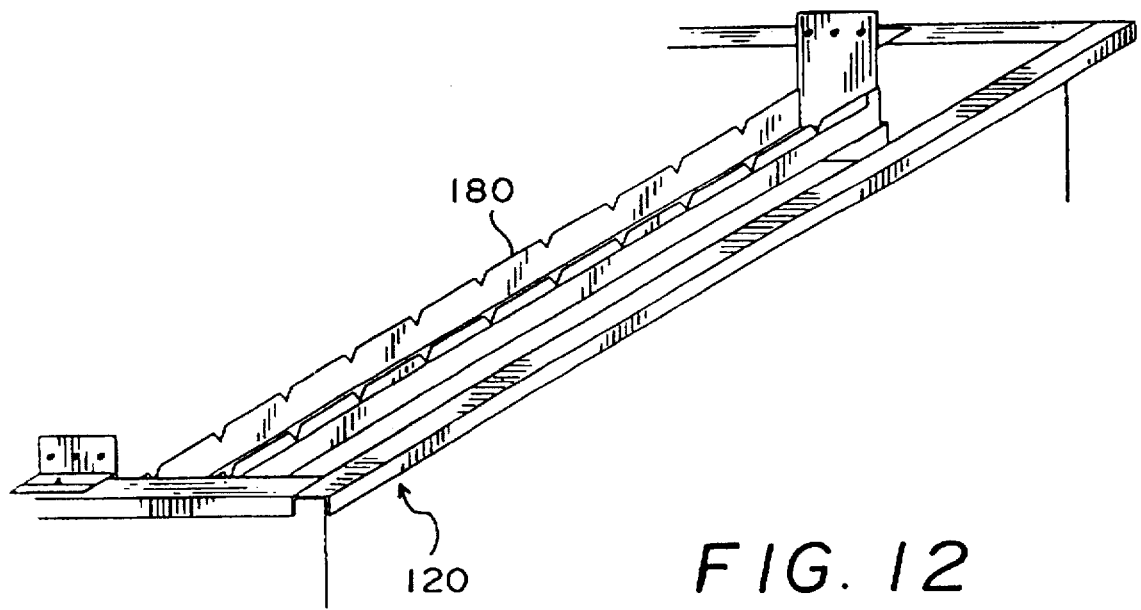
FIG. 12 is an end elevation view of the weir assembly.

Referring now to FIGS. 11 and 12, there is shown a weir 180 which can be used to collect the discharge of effluent from the upper zone of the bioreactor 120. One or more weirs 180 are positioned at intervals across the top of the bioreactor so that when the effluent level rises above the top edge of the weir it flows into the weir and is then discharged through a pipe 182 to the outside of the vessel.

The system performance can be optimized by monitoring the amount of organic material the system can efficiently treat. This is accomplished by placing a transducer such as, though not limited to, a pH sensor and a microprocessor into the system to detect when an unfavorable condition exists, such as, for example, a low pH level, and shut down the flow of influent untreated waste water until the conditions become favorable. An inline pH electrode 190 in the recycling pipe 32 and a microprocessor control system 192 connected between the electrode and pump 60 (FIG. 1) can protect anaerobic systems from organic overload. A BOD or COD sensor and a microprocessor control in the last stage recycling pipe 32 can regulate the effluent BOD or COD concentration to guarantee certain system effluent concentrations.

The attached film pulsed bed system of the invention is suitable for use with anaerobic, facultative and aerobic bacteria.

An anaerobic biological process reduces biochemical oxygen demand(BOD) by removing biodegradable organic material from waste water. The organic material is converted to methane, carbon dioxide, water and cellular material. The pulsed bed of the reactor is inoculated with facultative and anaerobic microorganisms including acid forming and methane forming bacteria.

An anoxic biological process causes, though not limited to, the denitrification and sulfate reduction of waste water. The pulsed bed of the reactor is inoculated with facultative microorganisms.

An aerobic biological process removes BOD by converting the waste to carbon dioxide water and cellular material and may also cause nitrification of waste water. The pulsed bed is inoculated with facultative and aerobic microorganisms. In addition a source of oxygen is required. Preferably the treated waste water to be recycled is passed through an oxygen aeration device external to the bioreactor and returned to the bioreactor.

A waste water treatment system could be a combination of one or more different microorganism type attached film pulsed bed units. For example, an anaerobic unit, an aerobic unit and an anoxic unit are connected in series so that the waste water travels sequentially from one to the other to ensure complete degradation of the waste. In another example, a single vessel containing anaerobic and facultative microorganisms could be connected in series to a vessel containing aerobic microorganisms so that the waste water travels sequentially from one to the other to ensure complete degradation of the waste.

The attached film pulsed bed system is more effective than existing attached film expanded bed systems and has a lower environmental impact. By pulsing the liquid into the bed in an intermittent manner rather than by a continuous flow a quiescent period is created for each plug flow which allows complete integration of the waste water and microorganisms and more degradation time, resulting in a highly efficient treatment cycle. Intermittent and sequential distribution of the pulses permits extremely good integration of the microorganisms and waste without expansion of the bed.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A process for the biological treatment of waste water in a bioreactor containing a bed of support particles having an attached biofilm and entrapped microorganisms in a lower zone of the bioreactor comprising:

continuously introducing waste water into the bed of support particles through a plurality of discharge ports adjacent a bottom surface of the bed; and directing the waste water through each one of the plurality of discharge ports in sequence followed by a quiescent period to intermittently hydraulically expand a portion of the bed in the immediate vicinity of each discharge port and form a series of plugs of waste water integrated with the microorganisms in the immediate vicinity of each discharge port and to promote biological degradation of contaminants in the waste water of each plug by the microorganisms.

2. The process according to claim 1, further comprising continuously expelling treated waste water from the bed to form a layer of the treated waste water in an upper zone of the bioreactor above the bed.

3. The process according to claim 2, further comprising continuously combining the treated waste water from the upper zone with untreated waste water to form a combined waste water prior to introducing the combined waste water to the bioreactor bed.

4. The process according to claim 3, further comprising intermittently delivering a flow of waste water to the bioreactor bed at a rate of between about 0.15 and 15 gallons/minute per square foot of bed impacted during each introduction of the flow at each discharge port.

5. The process according to claim 2, further comprising contacting gaseous products and attached particulate material and liquid expelled from the bed against a gas collector partially submerged in the layer of the treated waste water in the upper zone of the bioreactor to liberate the gaseous product from the particulate material and liquid.

6. The process according to claim 5, further comprising accumulating excess cellular particulate material in an intermediate zone above the bed.

7. The process according to claim 6, further comprising discharging gaseous products of the biological treatment from the upper zone of the reactor.

8. The process of claim 1, in which the quiescent period is from about 6 seconds to about 60 minutes.

9. The process according to claim 1, further comprising establishing an operating temperature in the bioreactor bed by passing the waste water through a heat exchanger.

10. The process according to claim 9 in which the operating temperature is between about 4° and 60° C.

11. The process according to claim 1, further comprising oxygenating the waste water prior to introducing the waste water to the bioreactor.

12. The process according to claim 11, for removing biodegradable organic material from the waste water under aerobic conditions, in which the microorganisms include aerobic microorganisms.

13. The process according to claim 11, for achieving nitrification of the waste water under aerobic conditions, in which the microorganisms include aerobic microorganisms.

14. The process according to claim 1, in which the plurality of discharge ports cooperates with one recycling pump to form a single pulsed bed system in the bioreactor.

15. The process according to claim 14, in which one or more of the single pulsed bed systems are connected in series within the bioreactor.

16. The process according to claim 1, in which the bed of support particles is selected from the group consisting of sand, garnet, volcanic cinders, flyash, coal, glass, plastic, activated carbon, alumina and diatomaceous earth and mixtures thereof.

17. The process according to claim 1, in which the support particles have an average diameter of between about 0.005 and 3 mm.

18. The process according to claim 1, in which the support particles have an average specific gravity of between about 0.01 and 3 grams per milliliter.

19. The process according to claim 1, for removing biodegradable organic material from the waste water under anaerobic conditions and converting the biodgradable organic material to methane, carbon dioxide, water and cellular material, in which the microorganisms include facultative and anaerobic microorganisms, including acid forming and methane forming bacteria.

20. The process according to claim 1, for achieving denitrification and sulfate reduction of the waste water under anoxic conditions, in which the microorganisms include facultative microorganisms.

21. The process according to claim 1, for flocculating organic and inorganic particulate material formed by the biological purification of the waste water.

22. The process according to claim 1, for achieving attached biofilm and entrapped microorganism growth in the bed further comprising loading the waste water with a heterogeneous bacterial culture and the waste water with macro and micro nutrients.

23. The process according to claim 1, in which one or more bioreactors are connected in series.

24. The process according to claim 23, in which a first bioreactor consists essentially of anaerobic and facultative microorganisms and a second bioreactor consists essentially of aerobic microorganisms.

25. A process for the biological treatment of waste water in a bioreactor containing a bed of support particles having an attached biofilm and entrapped microorganisms in a lower zone of the bioreactor comprising:

continuously introducing a flow of waste water containing from 100% to 0% untreated waste water and from 0% to 100% treated waste water into the bed of support particles through each one of two or more discharge pipelines having a discharge port adjacent a bottom surface of the bed;

directing the waste water through each one of the two or more discharge pipelines in a sequential manner followed by a quiescent period to intermittently hydraulically expand a portion of the bed in the immediate vicinity of each discharge port and form a series of plugs of waste water integrated with microorganisms in the immediate vicinity of each discharge port and to promote biological degradation of contaminants in the waste water of each plug by the microorganisms;

expelling treated waste water from each plug to form a layer of the treated waste water in an upper zone of the bioreactor above the bed;

contacting gaseous products and attached particulate material expelled from each plug against a gas collector partially submerged in the layer of the treated waste water in the upper zone of the bioreactor to liberate the gaseous product from the particulate material;

accumulating excess cellular particulate material in an intermediate zone above the bed; and discharging gaseous products of the biological treatment from the upper zone of the bioreactor.

26. The process according to claim 25, further comprising continuously combining the treated waste water with untreated waste water to form a combined waste water prior to introducing the combined waste water to the lower zone of the bioreactor.

27. The process according to claim 25, in which each one of the two or more discharge pipelines cooperate with one recycling pump to form a single pulsed bed system in the bioreactor.

28. The process according to claim 27, in which one or more single pulsed bed systems are connected in series within the bioreactor.

29. A process for the treatment of flowable waste in a vessel containing a bed of particles having entrapped microorganisms in a lower zone of the vessel comprising:

continuously introducing a flowable waste stream through a plurality of discharge ports adjacent a bottom surface of the bed;

directing the flowable waste through each one of the plurality of discharge ports in sequence followed by a quiescent period to intermittently hydraulically expand a portion of the bed in the immediate vicinity of each discharge port and form a series of plugs of waste integrated with the particles having entrapped organisms in the immediate vicinity of each discharge port to promote biological treatment of the flowable waste of each plug by the particles having entrapped organisms and production of treated waste.

30. The process according to claim 29, further comprising continuously combining the treated waste with the untreated flowable waste stream to form a combined waste stream prior to introducing the combined waste stream to the bed.

31. The process of claim 29, in which the quiescent period is from about 6 seconds to about 60 minutes.

32. The process according to claim 29, in which the flowable waste stream is selected from the group consisting of waste water, semi-solid waste water, a slurry, a solvent, and mixtures thereof.

33. The process according to claim 29, further comprising establishing an operating temperature in the vessel bed by passing the flowable waste stream through a heat exchanger.

34. An apparatus for the biological treatment of waste water comprising:

a bioreactor having a bottom;

a bed of support particles having an attached biofilm and entrapped microorganisms covering the bottom;

a plurality of discharge ports adjacent a bottom surface of the bed;

a plurality of discharge pipes, each discharge pipe connected to at least one discharge port;

a pump fluidly connected to the plurality of discharge pipes; and a sequential distributor fluidly connected between the pump and the plurality of discharge pipes for directing the waste water to each discharge pipe in sequence and producing intermittent discharge of waste water through each discharge port in a series of pulses followed by quiescent periods;

wherein the microorganisms in the immediate vicinity of each discharge port are integrated with the waste water to form a series of plugs which move upward through the bed responsive to successive discharges of waste water at each discharge port.

35. The apparatus of claim 34, in which the pump is a recycling pump, the recycling pump further comprising a recycling pipe having one end connected to a suction side of the recycling pump and an opposite end positioned above the bed within a layer of treated waste water for combining a portion of the treated waste water with untreated waste water.

36. The apparatus of claim 34, further comprising a control valve connected inline between each discharge port and the pump, wherein opening and closing of the control valve controls the discharge of the waste water.

37. The apparatus of claim 36, further comprising a time controller connected to the control valve for controlling the intermittent opening and closing of the control valve.

38. The apparatus according to claim 34, in which each discharge pipe extends from above the bed to adjacent the bottom surface of the bed.

39. The apparatus of claim 34, further comprising a heat exchanger fluidly connected to the pump for establishing a desired temperature within the bioreactor bed.

40. The apparatus according to claim 34, further comprising a sensor connected to the bioreactor for sensing a concentration of the contaminants.

41. The apparatus according to claim 40, further comprising a microprocessor connected to the sensor for controlling a flow of the waste water to be charged to the bioreactor.

42. The apparatus according to claim 34, in which the bed of support particles is selected from the group consisting of sand, garnet, volcanic cinders, flyash, coal, glass, plastic, activated carbon, alumina and diatomaceous earth and mixtures thereof.

43. The apparatus according to claim 42, in which the support particles have an average diameter of between about 0.005 and 3 mm.

44. The apparatus according to claim 34, in which the microorganisms are selected from the group consisting of anaerobic, aerobic and facultative microorganisms and mixtures thereof.

45. An apparatus for the biological treatment of waste water comprising:

a bioreactor having a bottom and a top;

a bed of support particles having an attached biofilm and entrapped microorganisms covering the bottom;

two or more spaced apart discharge ports adjacent a bottom surface of the bed;

a plurality of discharge pipes, each discharge pipe connected to at least one discharge port;

a recycling pump fluidly connected to each discharge pipe;

a sequential distributor fluidly connected between the pump and the plurality of discharge pipes for directing the waste water to each discharge pipe in sequence and producing intermittent discharge of waste water through each discharge port in a series of pulses followed by quiescent periods so that the microorganisms in the immediate vicinity of each discharge port are integrated with the waste water to form a series of plugs which move upward through the bed in an intermittent manner responsive to successive discharges of waste water at a specific port.

46. The apparatus of claim 45, further comprising a recycling pipe having one end connected to a suction side of the recycling pump and an opposite end positioned above the bed within a layer of treated waste water for combining a portion of the treated waste water with untreated waste water.

47. The apparatus according to claim 46, further comprising two or more gas collectors, each gas collector having a closed top, an open bottom and a sloping sidewall, each gas collector connected to the top of the bioreactor and arranged side-by-side, transversely across the width of the bioreactor so that the sloping sidewall of one gas collector overlaps with the sloping sidewall of the adjacent gas collector, the bottom of each gas collector being partially submerged in the layer of treated water.

48. The apparatus of claim 45, further comprising a control valve connected inline between each discharge port and the distributor, wherein opening and closing of the control valve controls the discharge of the waste water.

49. The apparatus of claim 48, further comprising a time controller connected to a group of two or more control valves for controlling the opening and closing of each control valve in a sequential manner so that when one control valve of the group is open each of the other control valves of the group is essentially closed.

50. The apparatus according to claim 45, in which each discharge pipe extends from above the bed to adjacent the bottom surface of the bed.

51. The apparatus of claim 45, which each discharge port is equally spaced in the cross section of the bioreactor, between about 6 in. and 60 in. apart.

52. The apparatus according to claim 45, in which each one of the two or more discharge ports cooperate with one recycling pump to form a single pulsed bed system in the bioreactor.

53. The apparatus according to claim 52, further comprising one or more single pulsed bed systems connected in series within the bioreactor.

54. An apparatus for the biological treatment of a flowable waste stream comprising:

a vessel having a bottom;

a bed of particles having entrapped microorganisms covering the bottom;

a plurality of discharge ports adjacent a bottom surface of the bed;

a plurality of discharge pipes, each discharge pipe connected to at least one discharge port;

a pump fluidly connected to the plurality of discharge pipes; and a sequential distributor fluidly connected between the pump and the plurality of discharge pipes for directing the waste water to each discharge pipe in sequence and producing intermittent discharge of a flowable waste stream through each discharge port in a series of pulses followed by quiescent periods so that the particles having entrapped microorganisms in the immediate vicinity of each discharge port are integrated with the flowable waste stream to form a series of plugs which move upward through the bed responsive to successive discharges of the flowable waste stream at each discharge port.

55. The apparatus of claim 54, further comprising a control valve connected inline between each discharge port and the pump, wherein opening and closing of the control valve controls the discharge of the flowable waste stream.

56. The apparatus of claim 55, further comprising a time controller connected to the control valve for controlling the intermittent opening and closing of the control valve.

* * * * *